United States Patent
Ragusa et al.

(10) Patent No.: US 11,388,596 B2
(45) Date of Patent: Jul. 12, 2022

(54) SECURE TRANSMITTAL OF WIRELESS LOCAL AREA NETWORK ACCESS CODES

(71) Applicant: International Business Machines Corporation, Armonk, NY (US)

(72) Inventors: Roberto Ragusa, Rome (IT); Gianluca Gargaro, Rome (IT); Matteo Rogante, Rome (IT); Paolo Ottaviano, Rome (IT)

(73) Assignee: International Business Machines Corporation, Armonk, NY (US)

(*) Notice: Subject to any disclaimer, the term of this patent is extended or adjusted under 35 U.S.C. 154(b) by 385 days.

(21) Appl. No.: 16/559,039

(22) Filed: Sep. 3, 2019

(65) Prior Publication Data

US 2021/0067968 A1    Mar. 4, 2021

(51) Int. Cl.

| | |
|---|---|
| *H04W 12/08* | (2021.01) |
| *H04B 11/00* | (2006.01) |
| *H04W 12/084* | (2021.01) |
| *H04B 17/336* | (2015.01) |
| *H04W 12/069* | (2021.01) |

(Continued)

(52) U.S. Cl.
CPC .......... *H04W 12/084* (2021.01); *H04B 11/00* (2013.01); *H04B 17/336* (2015.01); *H04W 12/069* (2021.01); *H04W 4/80* (2018.02); *H04W 84/12* (2013.01)

(58) Field of Classification Search
USPC .......................................................... 726/4
See application file for complete search history.

(56) References Cited

U.S. PATENT DOCUMENTS

| 8,977,683 B2 | 3/2015 | Rodman | |
|---|---|---|---|
| 2004/0133789 A1* | 7/2004 | Gantman | G06F 21/35 |
| | | | 713/189 |

(Continued)

FOREIGN PATENT DOCUMENTS

| CN | 104158597 A | 7/2016 |
|---|---|---|
| CN | 106411849 A | 2/2017 |

(Continued)

OTHER PUBLICATIONS

"List of ITU-T V-series recommendations", From Wikipedia, the free encyclopedia, Jul. 19, 2020, 6 pps., <https://en.wikipedia.org/wiki/List_of_ITU-T_V-series_recommendations>.

(Continued)

*Primary Examiner* — Blane J Jackson
(74) *Attorney, Agent, or Firm* — Heather Johnston (57) ABSTRACT

Aspects of the present invention disclose a method for encoding and transmitting access codes of a network to a computing device that is attempting to access the network. The method includes one or more processors identifying an audio command received by a first computing device. The method further includes generating a sound waveform that includes an access code of an access point, by encoding the access code into the sound waveform. The method further includes defining a sound power level of the sound waveform. The method further includes transmitting the sound waveform. The method further includes determining whether a second computing device receives the access code that is encoded in the sound waveform.

20 Claims, 4 Drawing Sheets

(51) Int. Cl.
*H04W 4/80* (2018.01)
*H04W 84/12* (2009.01)

(56) References Cited

U.S. PATENT DOCUMENTS

| | | | | |
|---|---|---|---|---|
| 2005/0213737 | A1* | 9/2005 | Rodman | H04M 11/06 379/202.01 |
| 2008/0175393 | A1* | 7/2008 | Oba | H04W 12/0431 380/279 |
| 2009/0094689 | A1* | 4/2009 | Gargaro | G06F 21/36 726/7 |
| 2009/0249077 | A1* | 10/2009 | Gargaro | G06Q 20/382 713/183 |
| 2012/0025950 | A1* | 2/2012 | Von Tippelskirch | G06F 21/35 340/5.74 |
| 2012/0214416 | A1* | 8/2012 | Kent | H04W 4/021 455/41.2 |
| 2014/0109211 | A1* | 4/2014 | Suzuki | G06F 21/35 726/7 |
| 2015/0215299 | A1* | 7/2015 | Burch | H04W 12/069 726/5 |
| 2016/0274881 | A1* | 9/2016 | Wang | H04L 61/2007 |
| 2017/0075653 | A1* | 3/2017 | Dawidowsky | G06F 3/017 |
| 2017/0118644 | A1* | 4/2017 | Le Moan | H04L 63/0876 |
| 2018/0063108 | A1* | 3/2018 | Gargaro | H04L 49/109 |
| 2018/0212930 | A1* | 7/2018 | Cammisa | H04L 63/0272 |
| 2020/0003482 | A1* | 1/2020 | Kim | F25D 23/028 |
| 2020/0324127 | A1* | 10/2020 | Leigh | A61N 1/3787 |
| 2021/0045032 | A1* | 2/2021 | Choi | H04W 36/36 |
| 2021/0076185 | A1* | 3/2021 | Tang | H04N 21/43637 |
| 2021/0099304 | A1* | 4/2021 | Kong | H04L 9/0847 |
| 2021/0117933 | A1* | 4/2021 | Lobner | G06Q 10/06 |
| 2021/0201918 | A1* | 7/2021 | Okabe | H04R 1/1091 |
| 2021/0235164 | A1* | 7/2021 | Kim | H04N 21/43637 |
| 2021/0235516 | A1* | 7/2021 | Wang | H04L 12/2869 |
| 2021/0243603 | A1* | 8/2021 | Yin | H04W 12/106 |

FOREIGN PATENT DOCUMENTS

| | | | | |
|---|---|---|---|---|
| EP | 2334111 A1 | * | 6/2011 | H04L 63/083 |
| GB | 2595836 A | * | 12/2021 | H04L 63/08 |
| GB | 2598190 A | * | 2/2022 | H04L 63/08 |
| WO | 2016023168 A1 | | 2/2016 | |
| WO | WO-2018172797 A1 | * | 9/2018 | H04B 11/00 |
| WO | 2018206107 A1 | | 11/2018 | |
| WO | WO-2020146076 A1 | * | 7/2020 | H04W 12/06 |

OTHER PUBLICATIONS

"MAC Authentication Bypass", Cisco, © 2007 Cisco Systems, Inc, 30 pps., <https://docstore.mik.ua/univercd/cc/td/doc/solution/macauthb.pdf>.

"WPS standard for wifi configuration of guests", From Wikipedia, the free encyclopedia, Mar. 19, 2019, 2 pps., <https://en.wikipedia.org/wiki/WPS>.

Aboba et al., "Extensible authentication protocol (EAP) key management framework", Network Working Group, 79 pps., Aug. 2008, <https://patents.google.com/scholar/3046634149068153041>.

"Cisco Identity Services Engine", Cisco, © 2018 Cisco and/or its affiliates, 3 pps., <http://www.cisco.com/c/dam/en/us/products/collateral/security/identity-services-engine/at-a-glance-c45-732857.pdf>.

* cited by examiner

SECURE TRANSMITTAL OF WIRELESS LOCAL AREA NETWORK ACCESS CODES

BACKGROUND OF THE INVENTION

The present invention relates generally to the field of security for mobile devices, and more particularly to secure sharing of wireless local area network access codes.

In recent years, developments in digital assistants and the growth of Internet of Things (IoT) capable devices have created competition to introduce new voice interfaces (e.g., for smart speakers, virtual assistance hardware/software, etc.). The IoT is a network of physical devices embedded with electronics, software, sensors, and connectivity which enables these devices to connect and exchange data with computer-based systems. Technology is embedded in IoT-enabled devices that allow these devices to communicate, interact, be monitored, and controlled over the Internet.

A wireless local area network (WLAN) is a wireless computer network that links two or more devices using wireless communication to form a local area network (LAN) within a limited area. Wi-Fi protected access (WPA) is a security protocol to protect information moving across WLAN networks. Wireless protected setup (WPS) is a wireless network security standard that is utilized in adding a new device to a wireless network using a passphrase encrypted with WPA based protocols. WPS is a common implementation used to transmit a WPA encrypted passphrase. WPS is based on a physical input on a base station (e.g. router) to initiate a process which broadcast temporary password that can be captured by a new device so that the new device can properly configure in order to join a network.

SUMMARY

Aspects of the present invention disclose a method, computer program product, and system for encoding and transmitting access codes of a network to a computing device that is attempting to access the network. The method includes one or more processors identifying an audio command received by a first computing device. The method further includes one or more processors generating a sound waveform that includes an access code of an access point, by encoding the access code into the sound waveform. The method further includes one or more processors defining a sound power level of the sound waveform. The method further includes one or more processors transmitting the sound waveform. The method further includes one or more processors determining whether a second computing device receives the access code that is encoded in the sound waveform.

DETAILED DESCRIPTION

Embodiments of the present invention allow for securely transmitting a network passphrase to a computing device requesting access to a network. Embodiments of the present invention encode a passphrase and utilize signal to noise ratios to securely transmit the passphrase to a proximate computing device. Embodiments of the present invention manipulate signal to noise ratios by incrementally increasing signal power of a signal carrying a passphrase to an upper limit of an audible range. Further embodiments of the present invention confirm receipt or failed decoding of a passphrase.

Some embodiments of the present invention recognize that some wireless protected setup (WPS) methods are vulnerable to WPS connection request from unauthorized devices. Thus, an unauthorized device may send multiple WPS connection requests in order to establish a connection with an access point of a wireless network, which transmits configuration and authentication data that enables the unauthorized device the ability to gain access to the wireless network. Various embodiments of the present invention remedy the WPS connection request issue by utilize signal to noise ratios to securely transmit a passphrase to a proximate computing device.

Embodiments of the present invention eliminate the implementation of a physical button on an access point of a network device by utilizing a voice-user interface to initiate an authentication process. Thus, improving network security by allowing a user to physically isolate a network device. Embodiments of the present invention can also reduce the amount of power utilized by using the minimum power necessary to transmit a signal carrying a passphrase to a computing device.

Implementation of embodiments of the invention may take a variety of forms, and exemplary implementation details are discussed subsequently with reference to the Figures.

Figure 1:
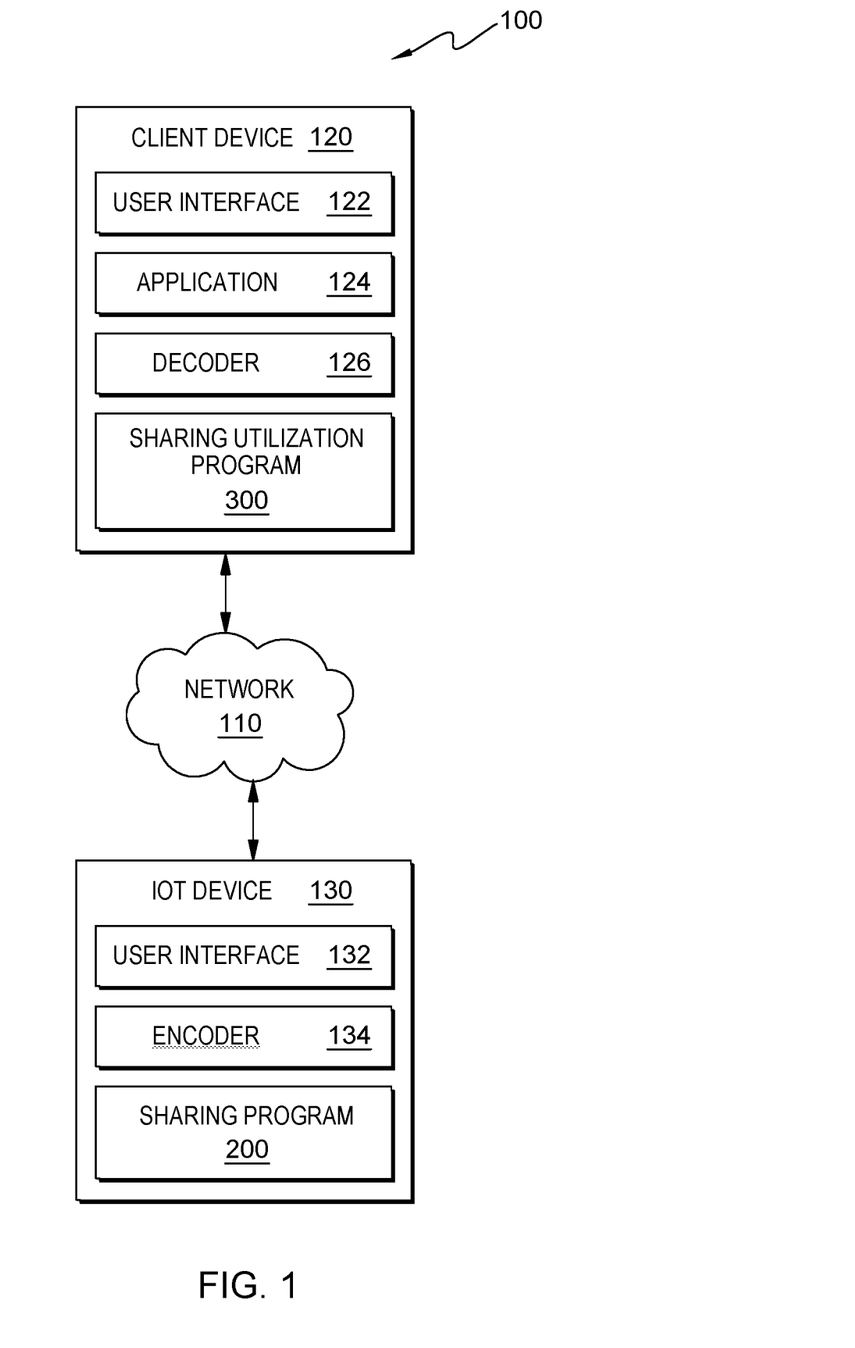
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Various embodiments of the present invention can utilize accessible sources of personal data, which may include personal devices (e.g., client device 120, IoT device 130, etc.), social media content, and/or publicly available information. For example, embodiments of the present invention can optionally include a privacy component that enables the user to opt-in or opt-out of exposing personal information. The privacy component can enable the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

An embodiment of data processing environment 100 includes client device 120, and IoT (Internet of Things) device 130, all interconnected over network 110. In one embodiment, client device 120 and IoT device 130 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120 and IoT device 130, in accordance with embodiments of the present invention.

In an example, a smart speaker (e.g., IoT device 130) receives audio from an operating environment of the smart speaker that includes a command. In this example, the smart speaker communicates with a laptop (e.g., client device 120) of a user to validate the command over a WLAN (e.g., via network 110). In another embodiment, client device 120 communicates with IoT device 130. For example, a smart speaker (e.g., IoT device 130) transmits an encoded signal to a laptop (e.g., client device 120). In this example, the laptop generates and transmits an audio message to the smart speaker confirming that the encoded signal was decoded.

In various embodiments of the present invention, client device 120 may be a workstation, personal computer, digital video recorder (DVR), media player, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 4, in accordance with embodiments of the present invention.

Client device 120 includes one or more speakers, a processor, user interface 122, application 124, decoder 126, and sharing utilization program 300. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements.

In another embodiment, user interface 122 is a script or application programming interface (API). In yet another embodiment, user interface 122 is a voice-user interface. A voice-user interface utilizes speech recognition methods to allow human interactions (e.g., spoken commands and questions) with computing systems. Voice command devices (e.g., home appliances, virtual assistants, smart phones, smart speakers, etc.) are typically controlled with a voice-user interface.

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access content. For example, application 124 is a web browser of a personal computer that a user can utilize to access streaming multimedia. In another embodiment, a user utilizes application 124 of client device 120 to register with sharing program 200 and sharing utilization program 300.

Decoder 126 is a demodulation device that extracts an original information bearing signal from a carrier wave. Generally, decoder 126 performs inverse operations of encoder 134 to recover information content (e.g., a string of characters, network key, etc.) from a modulated carrier signal. In an example embodiment, decoder 126 receives an encoded carrier signal from IoT device 130 and extracts data from the encoded carrier signal. In this example, decoder 126 extracts binary data that represents a string of characters utilized to access a WLAN.

Figure 3:
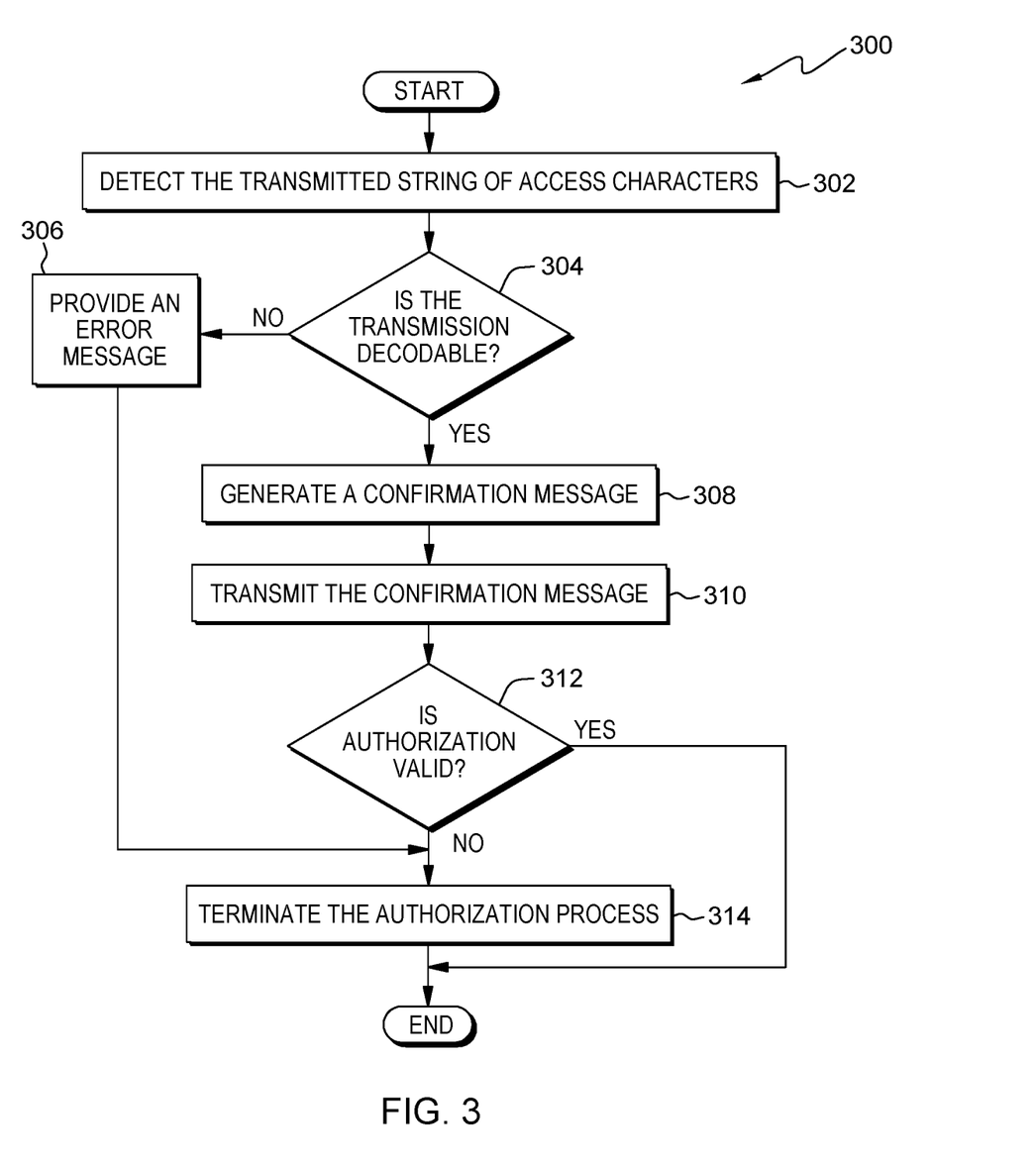
FIG. 3 is a flowchart depicting operational steps of a program, within the data processing environment of FIG. 1, for decoding an encoded transmission of sharing program 200 and providing an update of a decoding status of the encoded transmission, in accordance with an embodiment of the present invention.

Sharing utilization program 300 decodes an encoded transmission of sharing program 200 and provide an update of a decoding status of the encoded transmission. Generally, sharing utilization program 300 may be a client-side application of sharing program 200 operating locally on client device 120. In one embodiment, sharing utilization program 300 detects the encoded transmission originating from IoT device 130 and decodes the encoded transmission. For example, sharing utilization program 300 utilizes a microphone of client device 120 to detect a transmitted signal of IoT device 130. In this example, sharing utilization program 300 utilizes decoder 126 to decode a carrier signal to extract a string of characters (e.g., network key) from the carrier signal. In another embodiment, sharing utilization program 300 utilizes client device 120 to generate a confirmation message and transmits the generated message to IoT device 130. For example, sharing utilization program 300 generates a message to confirm that a carrier signal has been demodulated and defines an audio level of the message. In this example, sharing utilization program 300 transmits (e.g., plays the generated message over a speaker of client device 120) the generated message to IoT device 130. In another example, sharing utilization program 300 generates a message on client device 120 corresponding to an error in decoding a carrier signal of IoT device 130.

In various embodiments of the present invention, IoT device 130 may be a smart speaker, digital assistant, or any other device capable of executing computer readable program instructions, in accordance with embodiments of the present invention. IoT device 130 includes one or more speakers, a processor, user interface 132, encoder 134, and sharing program 200. In various embodiments of the present invention, a user utilizes IoT device 130 to play audio, receive commands, perform tasks, communicate with other IoT-enabled devices, and communicate with other users. For example, a smart speaker (e.g., IoT device 130) encodes and transmits a signal to a laptop (e.g., client device 120) of a user. IoT device 130 includes a respective instance of a user interface (e.g., user interface 132), which encompass equivalent capabilities and perform equivalent functions as discussed above with respect to user interface 122.

Encoder 134 is a modulation device that operates to vary one or more properties of a periodic waveform (e.g., carrier signal) with a modulating signal that contains information (e.g., a string of characters, network key, etc.) for transmission. Generally, encoder 134 can transfer a digital bit stream over an analog communication channel utilizing methods such as phase-shift keying (PSK), amplitude-shift keying (ASK), quadrature amplitude modulation (QAM), or coded orthogonal frequency-division multiplexing (COFDM). In an example embodiment, the audible frequency the communication channel utilizes may include ranges that support standard speakers and microphones (e.g., 100 Hz-30000 Hz). For example, depending on the modulation method utilized, a 14 kHz-18 kHz channel can transmit between 2000-5000 bits per second. In this example, if the data to be transmitted ranges from 500-1000 bits, then encoder 134 can transmit the data in 0.1 seconds or less. Additionally, encoder 134 can attempt a one or more transmissions at increasing power levels in 1-2 seconds.

Figure 2:
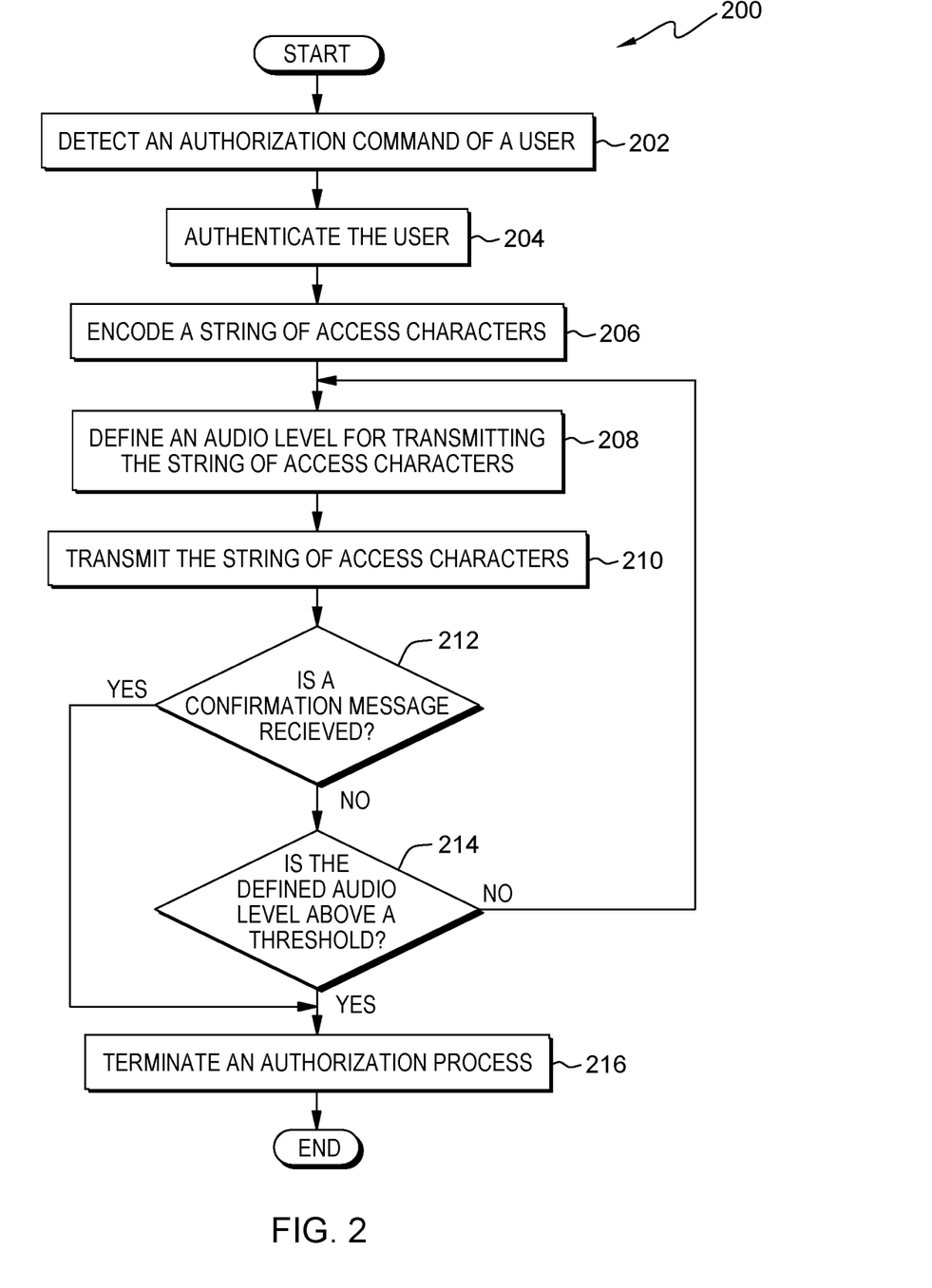
FIG. 2 is a flowchart depicting operational steps of a program, within the data processing environment of FIG. 1, for encoding and transmitting access codes of a network to a computing device, in accordance with an embodiment of the present invention.

Sharing program 200 can encode and transmit access codes of a network to a computing device that is attempting to access the network. Generally, sharing program 200 utilizes signal to noise ratio (SNR) to enhance the secure transmission of an access code from a first computing device to a second computing device. In one embodiment, sharing program 200 monitors user interface 132 of IoT device 130 to determine whether an authorization command is received. For example, sharing program 200 monitors a user interface of a smart speaker to determine whether a user has given the smart speaker a command that corresponds to a task that initiates transmittal of a network password. In this example, sharing program 200 identifies the command the smart speaker receives and determines whether the received command is stored in a server (not shown) that includes a list of varying authorization commands. In another embodiment, sharing program 200 authenticates a user giving an authorization command to IoT device 130. For example, sharing program 200 utilizes biometric data (e.g., voice recognition) to authenticate that an owner of the smart speaker (e.g., IoT device 130) is requesting to grant a computing device (e.g., client device 120) access to a home network (e.g., network 110). In another example, sharing program 200 authenticates a user given an authorization command by confirming an identity of the user through the use of a passphrase, two-way authentication method, etc. For example, sharing program 200 accesses a server (not shown) to retrieve a generated key. In this example, the server transmits the key to a computing device of a user and sharing program 200 prompts the user to input the key to validate the user.

In another embodiment, sharing program 200 encodes an access code of network 110 and transmits the access code to client device 120. For example, sharing program 200 utilizes an ASK modulator to encode an encrypted string of characters (e.g., a network key) and broadcast a digital signal at an audible level, which a computing device (e.g., client device 120) detects. In yet another embodiment, sharing program 200 determines whether a transmitted access code is received by client device 120. For example, sharing program 200 utilizes a microphone of a smart speaker (e.g., IoT device 130) to detect an audible confirmation from a computing device (e.g., client device 120) that receives and decodes an encrypted string of characters.

FIG. 2 is a flowchart depicting operational steps of sharing program 200, a program to encode and transmit access codes of a network to a computing device that is attempting to access the network, in accordance with embodiments of the present invention. In one embodiment, sharing program 200 initiates in response to IoT device 130 detecting an authorization command. For example, sharing program 200 initiates when a smart speaker receives a voice instruction corresponding to a task to share a network key with another computing device. In another embodiment, sharing program 200 is continuously monitoring IoT device 130. For example, sharing program 200 is constantly monitoring activities of a smart speaker after a user registers the smart speaker with a server. In another embodiment, sharing program 200 initiates in response to initialization of sharing utilization program 300. For example, sharing program 200 initiates in response to detecting that a user has enable a "password receive mode" (e.g., enabled sharing utilization program 300) on a computing device. In yet another embodiment, sharing program 200 initiates in response to an authorization process terminating.

In step 202, sharing program 200 detects an authorization command of a user. In one embodiment, sharing program 200 utilizes a microphone of IoT device 130 to detect an authorization command in the operating environment of IoT device 130. For example, sharing program 200 uses natural language processing (NLP) methods (e.g., speech recognition) to determine that a user is requesting a smart speaker (e.g., IoT device 130) to transmit an encrypted string of characters with a computing device (i.e., a user is requesting that the smart speaker perform a password sharing task). In this example, sharing program 200 captures audio received by the smart speaker and offloads the audio to a server not shown for speech recognition. In another embodiment, sharing program 200 monitors user interface 132 of IoT device 130 to determine whether a user provides IoT device 130 an authorization command. For example, sharing program 200 monitors a voice interface of a smart speaker. In this example, sharing program 200 determines whether a command is a request for authorization based on instructions generated in response to receiving the command.

In step 204, sharing program 200 authenticates the user. In one embodiment, sharing program 200 utilizes a microphone of IoT device 130 to authenticate a user furnishing an authorization command. For example, sharing program 200 uses voice recognition methods and unique vocal qualities of a user (e.g., a host, home owner, etc.) to verify the identity of the user. In this example, sharing program 200 compares a voice sample of the user stating a passphrase and compares the unique qualities of the voice sample (e.g., duration, intensity, dynamics, pitch, etc.) to that of a registered sample of the user to authenticate the identity of the user furnishing the authorization command. In another embodiment, sharing program 200 utilizes IoT device 130 to authenticate a user furnishing an authorization command. For example, a user registers with sharing program 200 and creates a passphrase to confirm that a user has authorization to perform particular functions. In this example, sharing program 200 uses a smart speaker (e.g., IoT device 130) to request a passphrase from the user to confirm that the user is authorized to give an authorization command (i.e., confirming an authorization level). In an alternative example, sharing program 200 may require a user to provide biometric data (e.g., fingerprint, retina data, etc.) to a smart speaker, which the smart speaker offloads to a sever not shown in order to confirm the identity of the user.

In step 206, sharing program 200 encodes a string of access characters. In one embodiment, sharing program 200 utilizes encoder 134 to modify a carrier signal with a modulating signal that includes a binary representation of a string of characters that correspond to an authentication pass code of network 110. For example, sharing program 200 uses a phase-shift keying (PSK) technique to encode an access code of a network. In this example, sharing program 200 retrieves a string of characters from a network device that corresponds to a network key. Additionally, sharing program 200 generates a data signal that corresponds to the network key and utilizes the data signal to cause a wave shift in the carrier signal (i.e., delaying a signal without changing an amplitude or frequency of the signal). Furthermore, sharing program 200 assigns the modified carrier signal a binary value of one (1) while the unchanged portion of the carrier signal is assigned a binary value of zero (0) (i.e., the phase of the conveys the information (e.g., the network key)).

In step 208, sharing program 200 defines an audio level for transmitting the string of access characters. In one embodiment, sharing program 200 selects a sound power level to transmit a string of characters to client device 120. For example, sharing program 200 uses a smart speaker (e.g., IoT device 130) to play an audible sound that includes the encoded string of characters. In this example, sharing program 200 selects the lowest audible sound power setting of the smart speaker based on the capabilities of the smart speaker to transmit the encoded string of characters to a computing device (e.g., client device 120 within the operating environment of the smart speaker). In another embodiment sharing program 200 defines a range of sound power levels to transmit a string of characters to client device 120. For example, sharing program 200 determines a smart speaker is capable of producing sounds in a decibel range of zero (0) to one hundred (100). In this example, sharing program 200 incrementally increases the decibel setting of a smart speaker prior to playing a sound wave encoded with a network access code. Additionally, sharing program 200 increases the decibel settings in response to sharing program 200 determining whether client device 120 receives a string of characters corresponding to a transmitted sound wave encoded with a network access code (in step 214).

In step 210, sharing program 200 transmits the string of access characters. In various embodiments of the present invention recognize that as a distance from a source of a signal (e.g., encoded sound wave) increases the signal-to-noise ratio of the signal increases, which effectively distorts the signal so that unintended receivers (i.e., receivers at greater distance from the source) cannot recover the encoded string of characters from the signal. In one embodiment, sharing program 200 utilizes a sound power level (defined in step 208) and a speaker of IoT device 130 to transmit a string of characters to client device 120. For example, sharing program 200 sets the decibel settings of a smart speaker (e.g., IoT device 130) to twenty (20) dB (e.g., equivalent to a whisper of one person, wristwatch ticking, etc.). In this example, sharing program 200 uses speaker of the smart speaker to broadcast an encoded sound wave to a computing device (e.g., client device 120) within the operating environment of the smart speaker where the sound power level of the encoded sound wave at the smart speaker (i.e., the source) is twenty (20) dB.

In decision step 212, sharing program 200 determines whether a confirmation message is received. In one embodiment, sharing program 200 utilizes sharing utilization program 300 to determine whether client device 120 receives an encoded string of characters IoT device 130 provides. For example, sharing program 200 uses sharing utilization program 300 to detect whether a computing device (e.g., client device 120) successfully decodes an encoded sound wave of a smart speaker (e.g., IoT device 130). In another embodiment, sharing program 200 determines whether client device 120 provides a confirmation message in response to receiving an encoded string of characters IoT device 130 transmits. For example, sharing program 200 utilizes a microphone of a smart speaker (e.g., IoT device 130) to detect a confirmation message from a computing device (e.g., client device 120).

If sharing program 200 determines that client device 120 provides a confirmation message in response to receiving an encoded string of characters of IoT device 130 (decision step 212, "YES" branch), then sharing program 200 ends (in step 216) the sharing process (i.e., the network key is delivered and client device 120 has access to network 110). For example, if sharing program 200 detects a confirmation message from a computing device (e.g., client device 120), then sharing program 200 ends due to the computing device obtaining the necessary credentials to access a personal wireless access network (e.g., network 110).

In decision step 214, sharing program 200 determines whether the defined audio level is above a threshold. More specifically, in response to sharing program 200 determining that client device 120 did not receive a string of characters transmitted by IoT device 130 (decision step 212, "NO" branch), then sharing program 200 determines whether a defined sound power level of a transmission of a string of characters of IoT device 130 is above a threshold level. For example, sharing program 200 uses a microphone of a smart speaker to monitor the operating environment of a smart speaker for a confirmation message of a computing device (e.g., client device 120) for a defined time period. In this example, if sharing program 200 does not detect the confirmation message from a computing device (e.g., client device 120) within a defined time period, then sharing program 200 determines that a confirmation message is not received.

In another example, sharing program 200 utilizes sharing utilization program 300 to parse an error message provided to a computing device (e.g., client device 120) from a decoder (i.e., in response to a failed decoding) to determine that an encoded sound wave of a smart speaker (e.g., IoT device 130) is not successfully received by the computing device. In one scenario, if sharing program 200 does not detect a confirmation message from a computing device (e.g., client device 120), then sharing program 200 determines whether the defined sound power level of a transmission of a string of characters is greater than a defined range of sound power levels.

In one embodiment, sharing program 200 compares the defined sound power level of a transmission of a string of characters to a defined audio threshold for sound power level of transmissions. For example, sharing program 200 determines an upper level value that corresponds to a maximum sound power level at which a sound wave may be transmitted and a current sound power level for a transmitted sound wave. In this example, the upper level value (e.g., defined threshold) may be determined based on preferences of a user, capabilities of a speaker of a smart speaker, or a predetermined system value. Additionally, sharing program 200 compares a sound power level of the transmitted sound wave to the maximum sound power level to determine whether the sound power level of the transmitted sound wave exceeds the maximum sound power level.

If sharing program 200 determines that the defined sound power level of a transmission of a string of characters does not exceeds a defined audio threshold for sound power level of transmissions (decision step 214, "NO" branch), then sharing program 200 redefines a sound power level of a transmission of a string of characters (in step 208). For example, if sharing program 200 determines that a sound power level of the transmitted sound wave does not exceed a maximum sound power level, then sharing program 200 increases the sound power level of the transmitted sound wave. Additionally, sharing program 200 may increase the power level of the transmitted wave until a confirmation message is received (in step 212) or until the defined audio threshold is met or exceeded.

In step 216, sharing program 200 terminates an authorization process. More specifically, in response to sharing program 200 determining that a defined sound power level of a transmission of a string of characters exceeds a defined audio threshold for sound power level of transmissions (decision step 214, "YES" branch), sharing program 200 terminates an authorization process of client device 120. For example, sharing program 200 determines that a sound power level of the transmitted sound wave exceeds a maximum sound power level, then sharing program 200 does not transmit the sound wave to a computing device again. In one embodiment, sharing program 200 ends. For example, sharing program 200 concludes attempts by a computing device to gain access to a wireless network of a user.

In another embodiment, in response to sharing program 200 determining that client device 120 provides a confirmation message in response to receiving an encoded string of characters of IoT device 130 (decision step 212, "YES" branch), then sharing program 200 ceases transmitting a string of access characters to client device 120. For example, if sharing program 200 detects a confirmation message from a computing device (e.g., client device 120), then sharing program 200 ends due to the computing device obtaining the necessary credentials to access a personal wireless access network (e.g., network 110). In yet another embodiment, sharing program 200 cease to transmit a string of access characters to client device 120. For example, sharing program 200 aborts a process to associate a computing device with a wireless network.

FIG. 3 is a flowchart depicting operational steps of sharing utilization program 300, a program for decoding an encoded transmission from sharing program 200 and providing an update of a decoding status of the encoded transmission, in accordance with embodiments of the present invention. In one embodiment, sharing utilization program 300 initiates in response to IoT device 130 detecting an authorization command from a user. For example, sharing utilization program 300 initiates when a smart speaker receives a voice instruction corresponding to a task to share a network key with another computing device. In another embodiment, sharing utilization program 300 is constantly monitoring activities of a smart speaker after a user links the smart speaker with an account of a server that includes sharing program 200.

In step 302, sharing utilization program 300 detects the transmitted string of access characters. In one embodiment, sharing utilization program 300 utilizes a microphone of client device 120 to receive a string of access characters transmitted from IoT device 130. For example, sharing utilization program 300 uses a microphone of a computing device (e.g., client device 120) to detect an encoded sound wave of a smart speaker (e.g., IoT device 130). In this example, sharing utilization program 300 feeds the encoded sound wave into demodulator of the computing device.

In decision step 304, sharing utilization program 300 determines whether the transmission is decodable. In one embodiment, sharing utilization program 300 utilizes decoder 126 to extract a string of access characters from a carrier signal transmitted from IoT device 130. For example, sharing utilization program 300 uses a demodulation device to decode an encoded sound wave of a smart speaker (e.g., IoT device 130). In this example, the demodulation device compares a phase of a reference signal (i.e., waveform that corresponds to the carrier signal prior to modulation) to phases of the encoded sound wave to extract information (e.g., a string of binary values which represent characters that compose the network key) from the encoded sound wave (e.g., carrier signal).

In another embodiment, sharing utilization program 300 determines whether decoder 126 is capable of extracting a string of access characters from a carrier signal transmitted from IoT device 130. For example, a demodulation device (e.g., decoder 126) may not be capable of comparing a phase of the encoded sound wave to a reference due to a high SNR of the encoded sound wave that distorts the encoded sound wave. However, the high SNR prevents unintended devices from receiving the encoded information (e.g., the network key). In one scenario, if sharing utilization program 300 determines that decoder 126 is not capable of extracting a string of access characters from a carrier signal transmitted from IoT device 130 (decision step 304, "NO" branch), then sharing utilization program 300 displays an error message (in step 306). In another scenario, if sharing utilization program 300 determines that decoder 126 is capable of extracting a string of access characters from a carrier signal transmitted from IoT device 130 (decision step 304, "YES" branch), then sharing utilization program 300 generates a confirmation message (in step 308), which sharing utilization program 300 transmits to IoT device 130.

In step 306, sharing utilization program 300 provide an error message. In one embodiment, sharing utilization program 300 utilizes application 124 to display a message to a user of client device 120. For example, sharing utilization program 300 uses a notification application of a computing device (e.g., client device 120) of a user to display an error message (e.g., decode failed) on a display of the computing device. In another embodiment, sharing utilization program 300 utilizes a speaker of client device 120 transmit an audible message to a user. For example, sharing utilization program 300 uses text-to-speech (TTS) to generate a waveform that conveys a textual error message (e.g., decode failed). In this example, sharing utilization program 300 transmits the generated waveform to a user through the speakers of the computing device. In an alternative example, sharing utilization program 300 uses positional data (e.g., GPS) of a computing device and the smart speaker to provide a message that includes directional instructions (i.e., move five (5) feet to the north) so that a user may move closer to the smart speaker in order to decrease the SNR of an encoded sound wave.

In step 308, sharing utilization program 300 generates a confirmation message. In one embodiment, sharing utilization program 300 utilizes a server (not shown) NLP to generate an audible message for IoT device 130. For example, sharing utilization program 300 uses text-to-speech (TTS) to generate a waveform that conveys a textual confirmation message (e.g., sound decoded). In this example, in response to a demodulating device (e.g., decoder 126) successfully decoding an encoded sound wave, sharing utilization program 300 generates a waveform corresponding to a textual confirmation (e.g., access code received) of the demodulating device. In another embodiment, sharing utilization program 300 can encode a carrier signal with a confirmation message, which IoT device 130 can decode.

In step 310, sharing utilization program 300 transmits the confirmation message. In one embodiment, sharing utilization program 300 utilizes a speaker of client device 120 to transmit a generated message to IoT device 130. For example, sharing utilization program 300 defines a sound power level for a generated waveform and transmits the generated waveform to a smart speaker (e.g., IoT device 130) using speakers of a computing device (e.g., client device 120).

In decision step 312, sharing utilization program 300 determines whether authorization is valid. In one embodiment, sharing utilization program 300 determines whether an extracted string of access characters grants client device 120 access to network 110. For example, sharing utilization program 300 utilizes the decoded network key to configure a computing device (e.g., client device 120) to connect to a WLAN. In one scenario, if sharing utilization program 300 determines an extracted string of access characters grants client device 120 access to network 110 (decision step 312, "YES" branch), then sharing utilization program 300 completes the authorization process (i.e., IoT device 130 has successfully shared a network access code with client device 120). In another scenario, if sharing utilization program 300 determines an extracted string of access characters grants client device 120 access to network 110 (decision step 312, "YES" branch), then sharing utilization program 300 transmits a message to IoT device 130 via network 110.

In step 314, sharing utilization program 300 terminates the authorization process. More specifically, in response to sharing utilization program 300 determining an extracted string of access characters does not grant client device 120 access to network 110 (decision step 312, "NO" branch), sharing utilization program 300 terminates an authorization process of client device 120 (step 314). For example, sharing utilization program 300 determines that an extracted string of access characters fail to authenticate a computing device, then utilization program 300 aborts a process to associate a computing device with a wireless network. In one embodiment, sharing program 200 ends. For example, sharing utilization program 300 concludes attempts by a computing device to gain access to a wireless network of a user.

Figure 4:
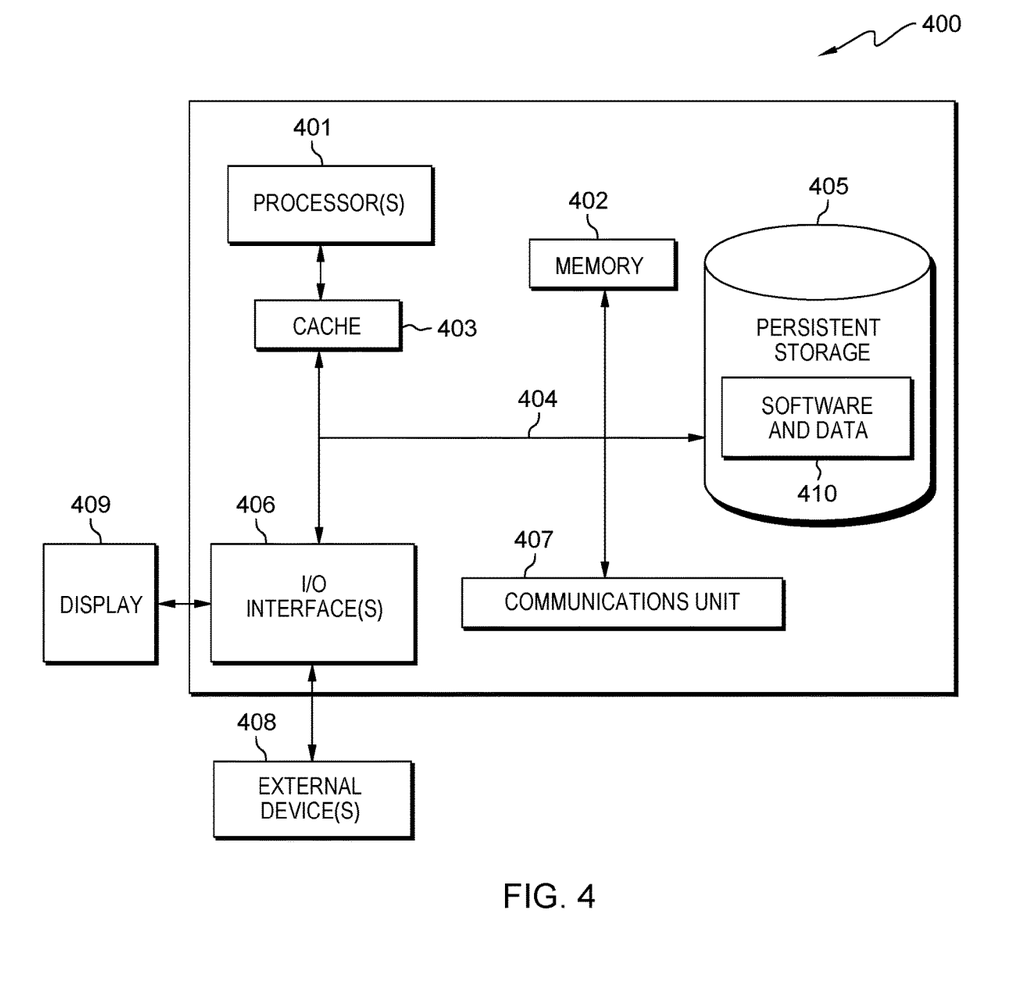
FIG. 4 is a block diagram of components of the proxy server computer representative of the client device, Internet of Things (IoT) device, and server of FIG. 1, in accordance with an embodiment of the present invention.

FIG. 4 depicts a block diagram of components of client device 120, IoT device 130, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124, decoder 128, and sharing utilization program 300. With respect to IoT device 130, software and data 410 includes data of encoder 134 and sharing program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for sharing network access information, the method comprising:
  identifying, by one or more processors, an audio command received by a first computing device;
  generating, by one or more processors, a sound waveform that includes an access code of an access point, by encoding the access code into the sound waveform;
  defining, by one or more processors, a sound power level of the sound waveform;
  transmitting, by one or more processors, the sound waveform; and
  determining, by one or more processors, whether a second computing device receives the access code that is encoded in the sound waveform.

2. The method of claim 1, wherein determining whether the second computing device receives the access code that is encoded in the sound waveform, further comprises:
  in response to determining that the second computing device receives the access code that is encoded in the sound waveform, wherein, the second computing device, validates network authorization access of the second computing device, monitoring, by one or more processors, communications from the second computing device for a verification message that validates network authorization access of the second computing device.

3. The method of claim 1, further comprising:
  in response to determining that the second computing device does not receive the access code that is encoded in the sound waveform, identifying, by one or more processors, transmission of an error message from the second computing device, wherein the error message includes directions; and
  defining, by one or more processors, a second sound power level of the sound waveform that is greater than the first sound power level.

4. The method of claim 3, further comprising:
  determining, by one or more processors, whether the second sound power level exceeds a defined threshold, wherein the defined threshold is within a range of audible frequencies.

5. The method of claim 1, wherein identifying the audio command received by the first computing device, further comprises:
  monitoring, by one or more processors, an interface of the first computing device;
  determining, by one or more processors, that the audio command includes a request for the access code of the access point; and
  verifying, by one or more processors, an identity of a user providing the audio command.

6. The method of claim 1, wherein generating the sound waveform that includes the access code of the access point, by encoding the access code into the sound waveform, further comprises:
  modifying, by one or more processors, a carrier signal based on a modulating signal that corresponds to one or more characters of the access code; and
  selecting, by one or more processors, a sound power level within an audible range of frequencies for transmission of the modified carrier signal.

7. The method of claim 1, wherein determining whether the second computing device receives the access code that is encoded in the sound waveform, further comprises:
  identifying, by one or more processors, a message of the second computing device; and
  determining, by one or more processors, whether the message includes an indication that a demodulator of the second computing device has decoded the access code from the sound waveform, wherein decoding is based at least in part on a signal to noise ratio (SNR) of the sound waveform that includes signal distortion due to a communication channel.

8. A computer program product comprising:
  one or more computer readable storage media and program instructions stored on the one or more computer readable storage media, the program instructions comprising:
  program instructions to identify an audio command received by a first computing device;
  program instructions to generate a sound waveform that includes an access code of an access point, by encoding the access code into the sound waveform;
  program instructions to define a sound power level of the sound waveform;
  program instructions to transmit the sound waveform; and
  program instructions to determine whether a second computing device receives the access code that is encoded in the sound waveform.

9. The computer program product of claim 8, wherein program instructions to determine whether the second computing device receives the access code that is encoded in the sound waveform, further comprise program instructions to:
  in response to determining that the second computing device receives the access code that is encoded in the sound waveform, wherein, the second computing device, validates network authorization access of the second computing device, monitor communications from the second computing device for a verification message that validates network authorization access of the second computing device.

10. The computer program product of claim 8, further comprising program instructions, stored on the one or more computer readable storage media, to:
  in response to determining that the second computing device does not receive the access code that is encoded in the sound waveform, identify transmission of an error message from the second computing device, wherein the error message includes directions; and
  define a second sound power level of the sound waveform that is greater than the first sound power level.

11. The computer program product of claim 10, further comprising program instructions, stored on the one or more computer readable storage media, to:
  determine whether the second sound power level exceeds a defined threshold, wherein the defined threshold is within a range of audible frequencies.

12. The computer program product of claim 8, wherein program instructions to identify the audio command received by the first computing device, further comprise program instructions to:
  monitor an interface of the first computing device;
  determine that the audio command includes a request for the access code of the access point; and
  verify an identity of a user providing the audio command.

13. The computer program product of claim 8, wherein program instructions to generate the sound waveform that includes the access code of the access point, by encoding the access code into the sound waveform, further comprise program instructions to:
   modify a carrier signal based on a modulating signal that corresponds to one or more characters of the access code; and
   select a sound power level within an audible range of frequencies for transmission of the modified carrier signal.

14. The computer program product of claim 8, wherein program instructions to determine whether the second computing device receives the access code that is encoded in the sound waveform, further comprise program instructions to:
   identify a message of the second computing device; and
   determine whether the message includes an indication that a demodulator of the second computing device has decoded the access code from the sound waveform, wherein decoding is based at least in part on a signal to noise ratio (SNR) of the sound waveform that includes signal distortion due to a communication channel.

15. A computer system comprising:
   one or more computer processors;
   one or more computer readable storage media; and
   program instructions stored on the computer readable storage media for execution by at least one of the one or more processors, the program instructions comprising:
   program instructions to identify an audio command received by a first computing device;
   program instructions to generate a sound waveform that includes an access code of an access point, by encoding the access code into the sound waveform;
   program instructions to define a sound power level of the sound waveform;
   program instructions to transmit the sound waveform; and
   program instructions to determine whether a second computing device receives the access code that is encoded in the sound waveform.

16. The computer system of claim 15, wherein program instructions to determine whether the second computing device receives the access code that is encoded in the sound waveform, further comprise program instructions to:
   in response to determining that the second computing device receives the access code that is encoded in the sound waveform, wherein, the second computing device, validates network authorization access of the second computing device, monitor communications from the second computing device for a verification message that validates network authorization access of the second computing device.

17. The computer system of claim 15, further comprising program instructions, stored on the one or more computer readable storage media for execution by at least one of the one or more processors, to:
   in response to determining that the second computing device does not receive the access code that is encoded in the sound waveform, identify transmission of an error message from the second computing device, wherein the error message includes directions; and
   define a second sound power level of the sound waveform that is greater than the first sound power level.

18. The computer system of claim 17, further comprising program instructions, stored on the one or more computer readable storage media for execution by at least one of the one or more processors, to:
   determine whether the second sound power level exceeds a defined threshold, wherein the defined threshold is within a range of audible frequencies.

19. The computer system of claim 15, wherein program instructions to identify the audio command received by the first computing device, further comprise program instructions to:
   monitor an interface of the first computing device;
   determine that the audio command includes a request for the access code of the access point; and
   verify an identity of a user providing the audio command.

20. The computer system of claim 15, wherein program instructions to generate the sound waveform that includes the access code of the access point, by encoding the access code into the sound waveform, further comprise program instructions to:
   modify a carrier signal based on a modulating signal that corresponds to one or more characters of the access code; and
   select a sound power level within an audible range of frequencies for transmission of the modified carrier signal.

\* \* \* \* \*